United States Patent
Comerford et al.

(10) Patent No.: US 7,440,741 B2
(45) Date of Patent: Oct. 21, 2008

(54) OVER-THE-AIR TESTING OF COMPACT FLASH RADIO

(75) Inventors: James Comerford, Manhasset, NY (US); Francisco Naranjo, Brentwood, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 522 days.

(21) Appl. No.: 10/251,496

(22) Filed: Sep. 19, 2002

(65) Prior Publication Data

US 2004/0203489 A1   Oct. 14, 2004

(51) Int. Cl.
*H04B 1/10* (2006.01)

(52) U.S. Cl. ............... 455/300; 455/90.3; 455/114.2; 455/128; 324/67.11

(58) Field of Classification Search ............... 455/300, 455/90.3, 114.2, 128, 296; 324/67.11
See application file for complete search history.

(56) References Cited

U.S. PATENT DOCUMENTS

| | | | | |
|---|---|---|---|---|
| 3,859,600 A | * | 1/1975 | Craven et al. | 455/302 |
| 4,600,116 A | * | 7/1986 | Inano et al. | 206/715 |
| 4,785,936 A | * | 11/1988 | Shpigelman | 206/454 |
| 4,855,870 A | * | 8/1989 | Russell et al. | 361/739 |
| 5,088,411 A | * | 2/1992 | Kurokawa et al. | 102/200 |
| 5,322,991 A | * | 6/1994 | Hanson | 235/462.46 |
| 5,805,667 A | * | 9/1998 | Alvarez et al. | 379/1.01 |
| 5,812,933 A | * | 9/1998 | Niki | 455/16 |
| 5,984,079 A | * | 11/1999 | Garcia | 198/397.02 |
| 6,021,315 A | * | 2/2000 | Telewski | 455/67.11 |
| 6,314,000 B1 | * | 11/2001 | Johnson | 361/816 |
| 6,512,459 B2 | * | 1/2003 | Benezech et al. | 340/686.4 |
| 6,564,949 B1 | * | 5/2003 | Saathoff | 211/70.6 |
| 7,035,594 B2 | * | 4/2006 | Wallace et al. | 455/67.12 |

* cited by examiner

*Primary Examiner*—Matthew Anderson
*Assistant Examiner*—Minh Dao
(74) *Attorney, Agent, or Firm*—Fay Kaplun & Marcin, LLP (57) ABSTRACT

A method and system for over-the-air testing of a radio transreceiver is described. The radio transreceiver is placed in an enclosure box that is shielded to prevent leakage of RF energy. A nest assembly holds in place the radio transreceiver during testing to provide repeatable results with different radios. The testing assembly allows high volume characterization of the radio transreceiver performance in an environment rich with interfering RF signals.

28 Claims, 5 Drawing Sheets

OVER-THE-AIR TESTING OF COMPACT FLASH RADIO

FIELD OF THE INVENTION

The present invention relates to methods and systems for testing a radio transreceiver used for voice and data transmission, and in particular a transreceiver used in a wireless network.

BACKGROUND INFORMATION

In recent years, many business functions have become dependent on the availability of connections to computer networks, for communications between employees, for data exchange, and for connection to databases, among other things. As the demand for network access increases, it has become necessary to provide access to computer networks at remote sites, and at locations where a traditional connection via wires do not exist. Accordingly, the need for wireless network access has become more prevalent in different types of business applications, where connections by wire are impossible or simply not practical.

The spread of wireless networks and devices that operate on those networks has been accelerated by the introduction of relatively inexpensive, mass produced radios that transmit and receive within the networks. Those radio transreceivers may be included in hubs of the network and in various peripheral devices that are connected together. For example, the radios may be built on a computer card adapter or on a bus card, which is then included in a computing device such as a portable computer or a dedicated computing device. These so called point of activity computing and communications systems include the wireless network system, mobile computers and various scanners and data entry devices that are all tied together by radios that provide the necessary connectivity One key requirement for the practical use of wireless networks is that the radios described above be produced in large numbers and inexpensively. Testing of the completed radios is an important step in the manufacturing process, necessary to ensure consistent performance of the wireless network devices. The testing must be carried out rapidly and inexpensively for very large numbers of radios, in less than optimal testing conditions. For example, the fixtures used in the testing must provide repeatable results for the large number of radios produced, and must do so in a manufacturing environment where electrical noise and radio transmissions may interfere with the performance measurements.

SUMMARY OF THE INVENTION

Accordingly, embodiments of the present invention include a testing apparatus for a radio transreceiver, which has a nest assembly to support and retain the radio transreceiver, an enclosure box surrounding the nest assembly and radio transreceiver, the enclosure box forming a barrier to RF energy, and a connection conduit to transfer signals to and from the radio transreceiver, the connection being coupled to the radio transreceiver.

In a different aspect, the invention is a method for over-the-air testing of a radio transreceiver, which includes the steps of inserting the radio transreceiver in a shielded enclosure box, connecting the radio transreceiver to an interface, and mechanically securing the radio transreceiver in a selected position. The method further includes providing test signals to the radio transreceiver and monitoring response of the radio transreceiver to the test signals.

DETAILED DESCRIPTION

Modern radio transreceivers used to connect devices in wireless networks require over-the-air, or non-conductive testing, where transmission and reception of the radio is tested without connecting wires to the antenna output of the unit. Testing includes steps to precisely measure and adjust the radio transmitter power for conformance to specifications, and to measure the receiver's sensitivity. These tasks are performed during high volume manufacturing, and must be simple and inexpensive to carry out, to keep the unit price of the transreceiver low.

The testing apparatus according to embodiments of the present invention includes many technical features that result in improvements in cost-effectiveness over conventional devices. For example, a consistent positioning of the radios being tested is achieved by using a non-metallic nest to hold the radios, and by securing the nest in place with a pedestal. The use of a nest is important because in many cases the radios are configured as a computer card or similar format, which is difficult to hold consistently in the same position and which requires a special interface. In particular, the radio may be tested before being placed in the card case, and may consist of essentially an electronic circuit board. Protection from interferences is provided, for example, by an enclosed box having RF absorbing materials to shield the radio therein from extraneous RF energy during testing. The radio's antennae are kept in the appropriate place by an antenna holder, such that repeatable measurements of the radio performance are always made.

Figure 1:
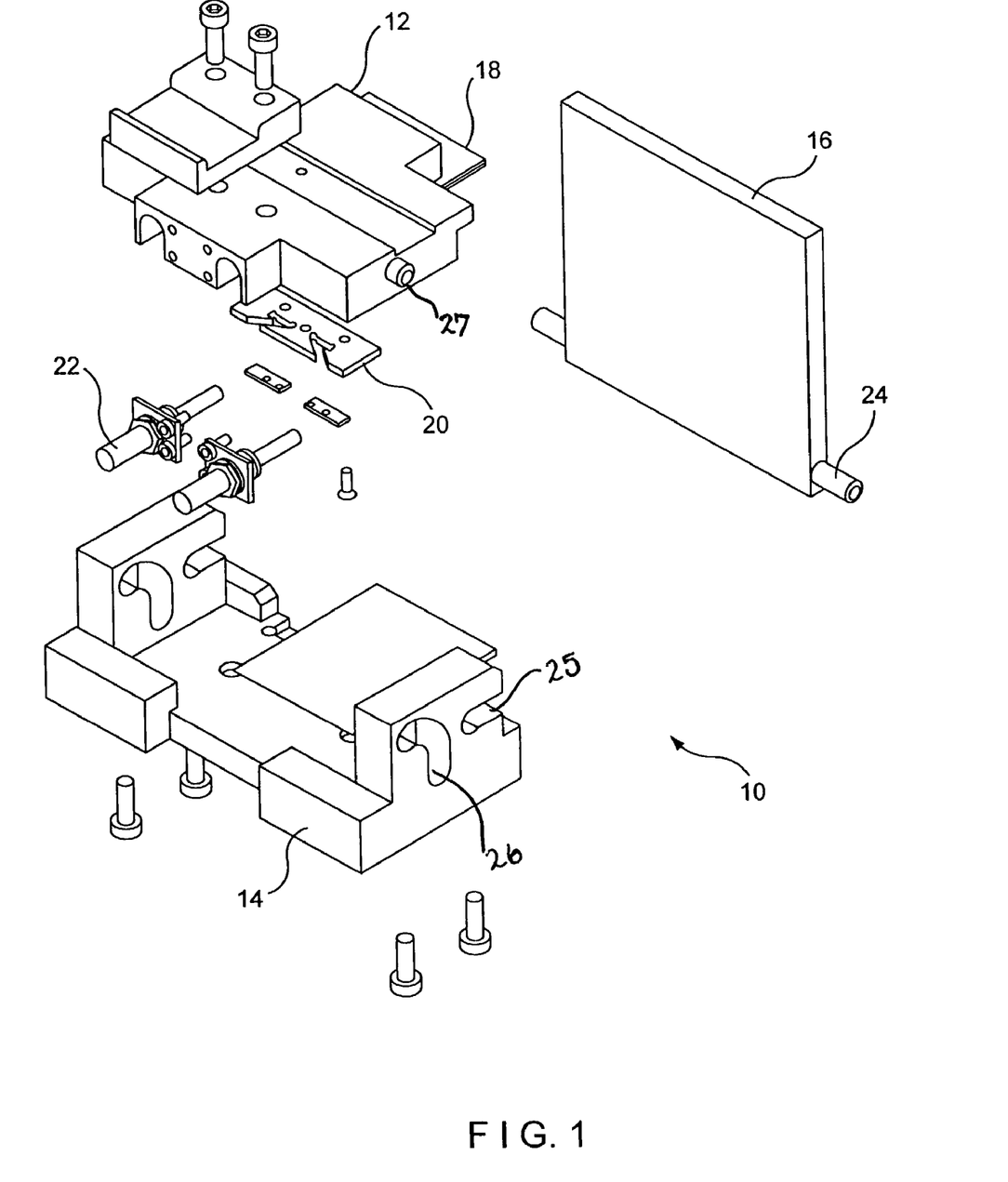
FIG. 1 is an exploded view of an holder for a radio transreceiver test fixture according to an embodiment of the present invention.
Figure 2:
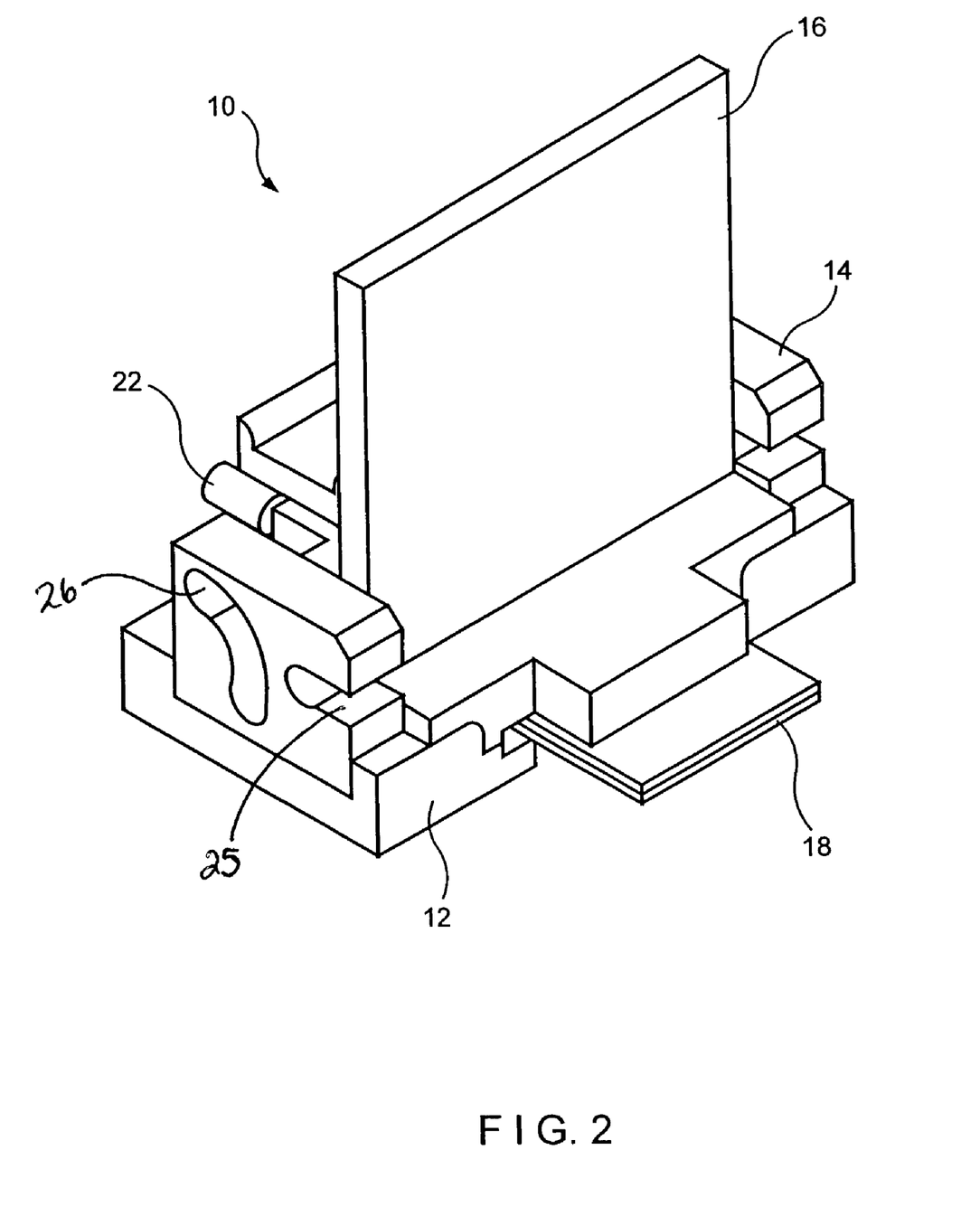
FIG. 2 is a perspective view of the radio transreceiver holder of FIG. 1, shown here in a closed and locked position.

Exemplary embodiments of the over-the-air radio testing apparatus according to the present invention may be further understood with reference to the following description and the appended drawings, wherein like elements are referred to with the same reference numerals. FIGS. 1 and 2 show an exemplary embodiment of a nest mechanical assembly used to hold in place the radio during testing. To more clearly show the testing assembly, the radio is omitted from FIGS. 1 and 2. Nest assembly 10 is made of several articulated components, so that the radio can be held in a desired orientation within the chamber of the testing apparatus. Once an orientation has been selected, the nest may be fixed in that position, so that successive tests of other radio units may be carried out with all the radio units in the same orientation, to ensure repeatable test results.

Nest assembly 10 includes a top portion 12 and a bottom portion 14 which may be articulated together so that the nest assembly 10 is orientable in different directions. An interface 18 may be provided on one of the top or bottom portions 12, 14, to provide a connection and support to the radio. For example, when the radio is formed on an integrated circuit board or similar configuration, the interface 18 may include a slot in which the radio board is inserted and held in place. Pins or other electrical connections to the radio board may also be provided. In some configurations, interface 18 may include a power supply to the radio, connections to antennae, and a connection to a control unit used to send instructions and test commands to the radio. In addition, a mechanical connection to the radio may be provided by interface 18, to prevent inadvertent movement of the radio during testing. Interface 18 may be designed to simulate the connection between the radio board and the device in which the radio will be used, to test the radio in the final production configuration.

In one exemplary embodiment, bottom portion 14 may be optimized to be mechanically attached to a support structure for nest 10, as will be described in greater detail below. Top portion 12 may be optimized to provide an interface with the radio board being tested, and further to provide a connection with the external test apparatus. Bottom portion 14 may include slots 26 adapted to receive projections 27 of the top portion 12, so that the two portions are able to pivot and be moved apart relative to one another. This configuration permits to separate nest 10 in two portions when the radio board is placed in the nest. For example, bottom portion 14 may remain attached to the support structure while the radio board is connected to top portion 12. In any case, the radio board can be connected more easily after the two portions of nest 10 are separated, and a more permanent mechanical and electrical connection can be maintained after the portions are re-joined together.

Nest 10 may also include a clamping cover 16 used to securely hold the radio in place. Clamping cover 16 may be pivotally attached to bottom portion 14 via, for example, pivots 24 that fit in slots 25. When clamping cover 16 is in the open position, as shown in FIG. 2, top and bottom portions 12, 14 may be pivoted apart, and the radio transreceiver may be inserted in nest 10. Once the radio is in place, top portion 12 is pivoted in the closed position over bottom portion 14, and clamping cover 16 is inserted in slots 25 to lock the assembly in place, preventing removal of the radio board. After testing is completed, the clamping cover 16 may be pivoted to the open position so that the two portions of nest 10 can be opened, and to remove the radio from interface 18. A gasket may be included around the perimeter of clamping cover 16, to better hold the assembly in place and to reduce vibrations. A thin layer of "echosorb" material may be coated on the surfaces of nest 10 and clamping cover 16 to help stabilize the radio in the testing position.

Several connectors 22 may be provided on nest assembly 10. Connectors 22 may form an interface between the radio and an external control unit, which will be described below, used to control the radio during testing. For example, connectors 22 may be in electrical contact with interface 18, which in turn is connected to the radio board. The exemplary embodiment uses two connectors, however, it should be apparent to one of skill in the art that more or fewer connectors may be used, and may be placed at different locations on nest 10. For example, a test signal may be sent to the radio to be transmitted by the radio during testing, and the resulting broadcast signal may be compared to an expected output signal. Known test radio signals received by the radio during testing may also be monitored through connectors 22, to determine the reception performance of the radio. In the exemplary embodiment described here, connectors 22 are attached to top portion 12, which also holds the radio board. A connection such as electrical wires or printed circuits may be used to electrically connect connector 22 with interface 18, to form a continuous path with the radio board when it is inserted in nest 10.

Figure 5:
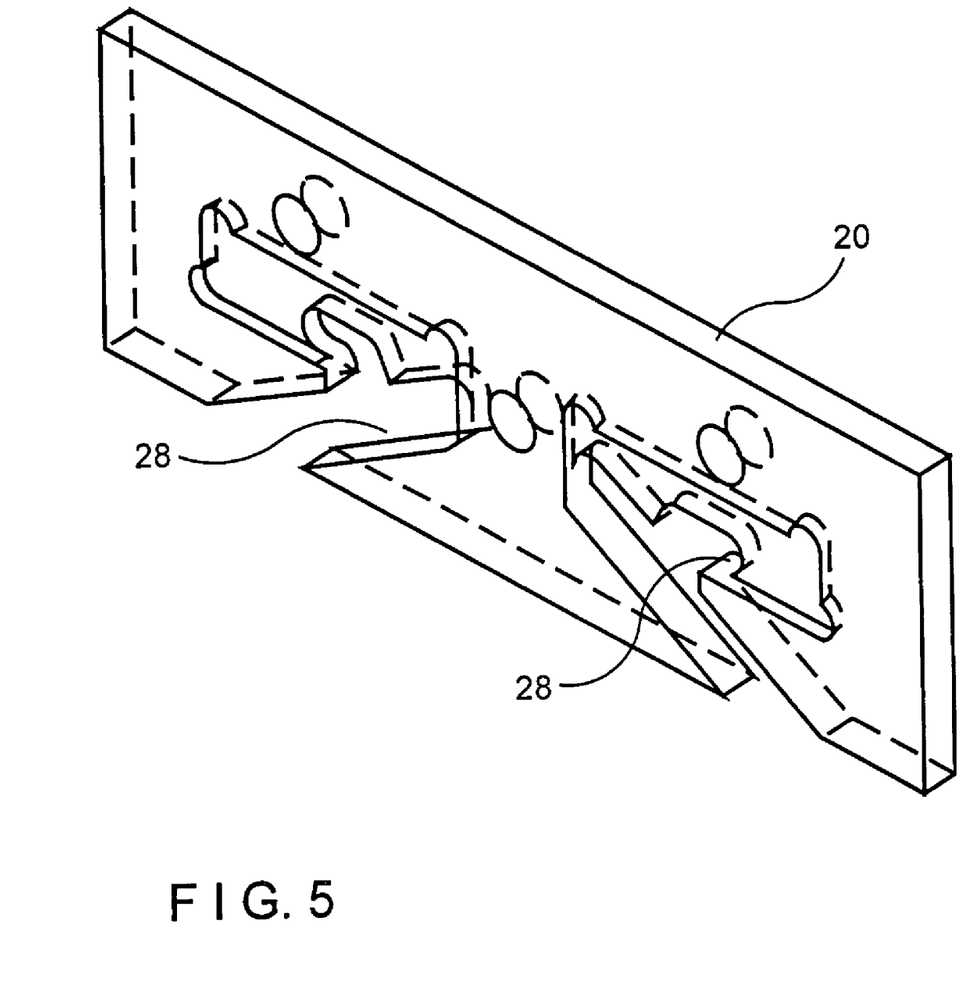
FIG. 5 is a detailed perspective view of an antenna holder included in the radio transreceiver holder according to the present invention.

An antennae holder 20 may be included in the construction of nest assembly 10. The purpose of antennae holder 20 is to position the transmitting and receiving antennae of the radio in the same place every time a new radio is mounted on nest 10. It is important that the antennae be in the same relative position every time, to obtain repeatable results from the testing sequence. A detailed view of the antennae holder 20 is shown in FIG. 5. Antennae holder 20 may include one or more locking grooves 28 in which the antenna, not shown, is inserted. The bottom of locking groove 28 may have a diameter comparable to the antenna's diameter, to lock it in place within groove 28. Antennae holder 20 may be fixed to nest mechanism 10, or may be movable in an unlocked position, so that different configurations of radios may be accommodated. In one embodiment, one or more antennae are part of the testing apparatus, and are connected to the radio when it is mounted on nest 10, through low insertion loss connections.

Figure 3:
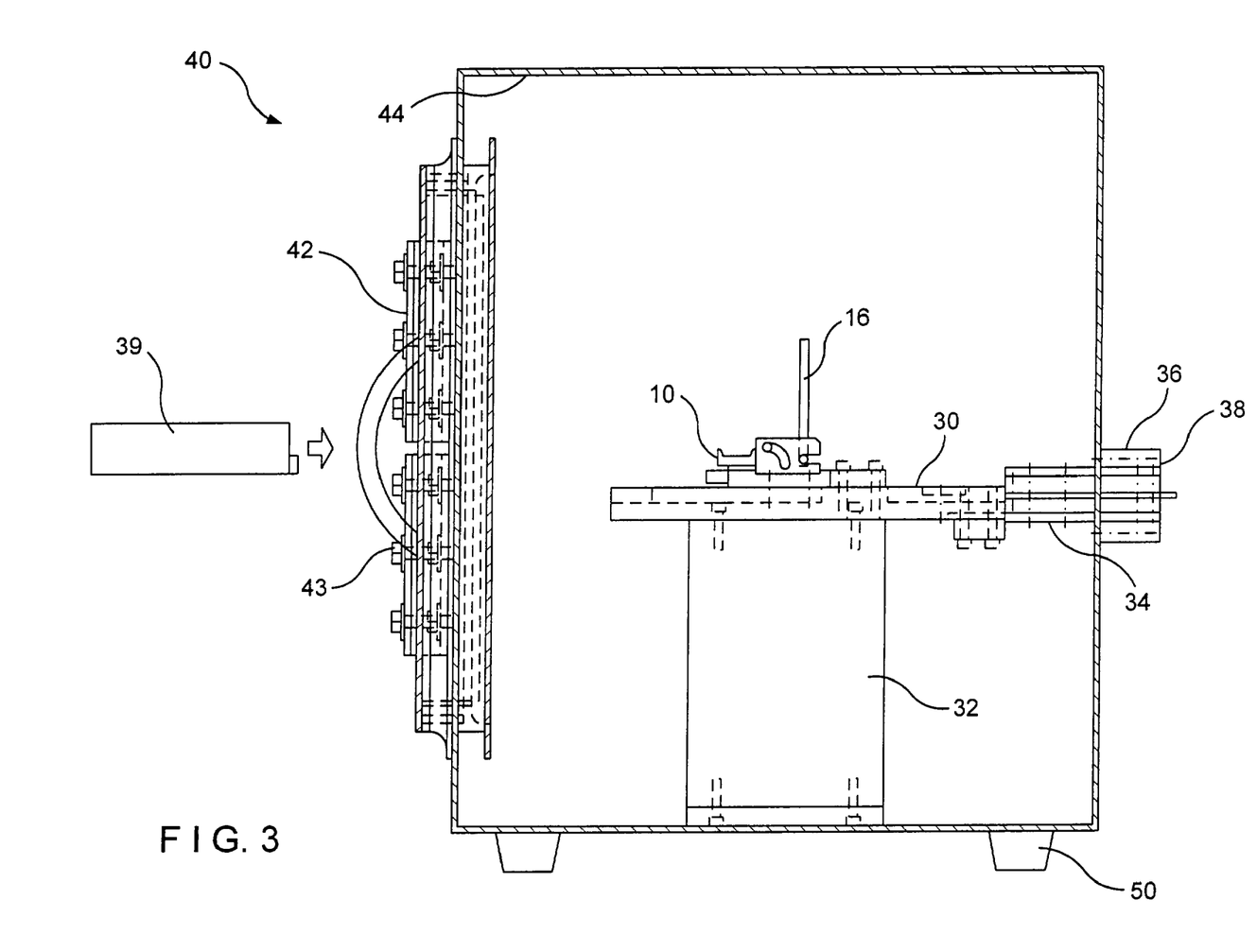
FIG. 3 is a side view of a radio transreceiver holder within an RF filter box assembly according to an embodiment of the present invention.
Figure 4:
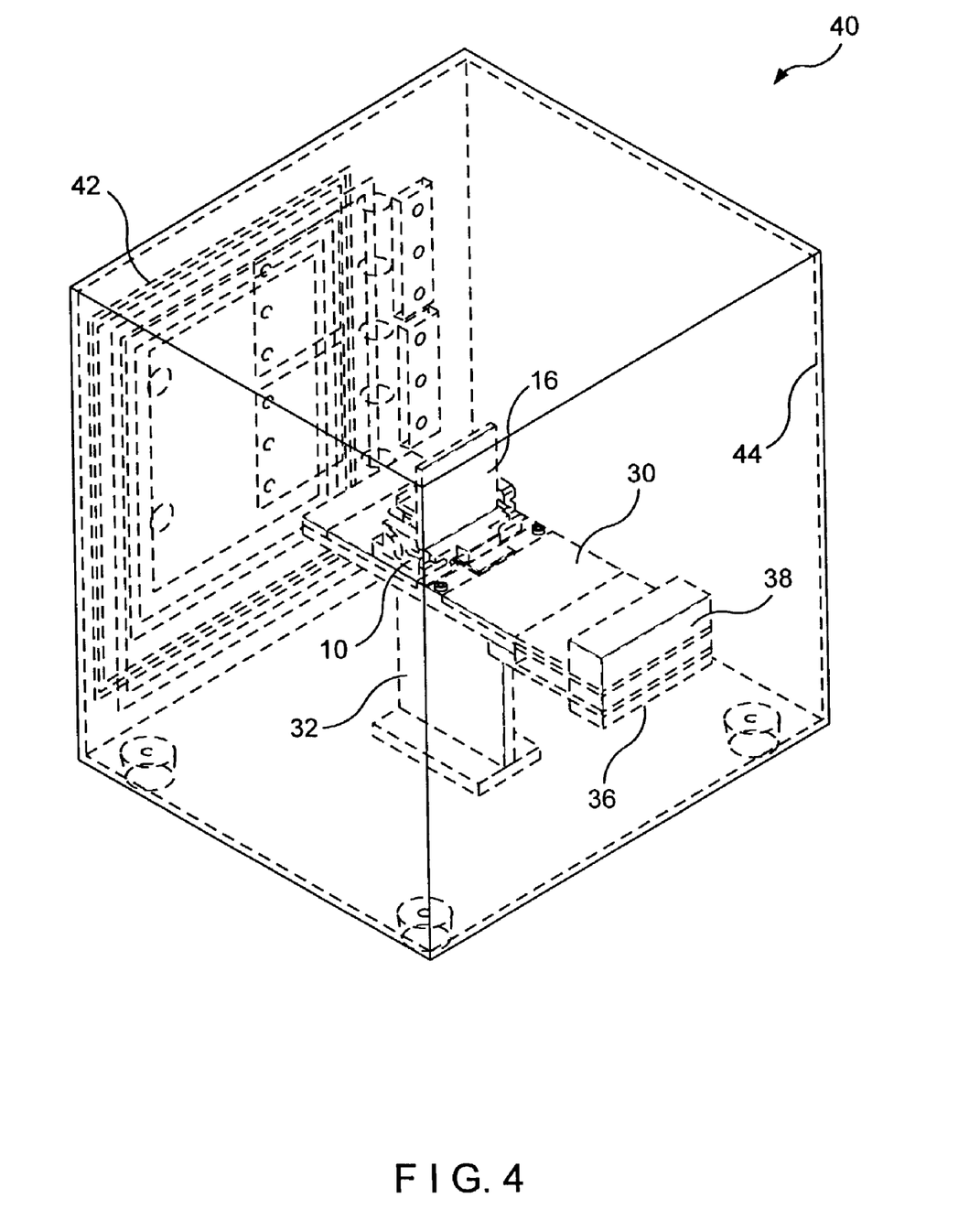
FIG. 4 is a perspective view of the radio transreceiver holder within an RF filter box shown in FIG. 3.

FIGS. 3 and 4 show different views of the complete testing apparatus for a radio transreceiver of wireless network devices, including the nest mechanism 10. An enclosure box assembly 40 is adapted to contain the nest mechanism 10, as well as supporting mechanisms. A radio transreceiver 39 is shown schematically outside of the enclosure box 40. Enclosure box 40 may have a door 42 on one side, sized to allow easy insertion and removal of the radios on nest 10. Nest 10 may be aligned with door 42 such that interface 18 is directed towards the opening, and the radio may be easily connected to interface 18. Fasteners 43 may be provided to secure door 42 in the closed position once the radio is inside. Enclosure box 40 and door 42 provide an enclosure that does not leak radio signals, to prevent outside signals from interfering with the calibration and testing of the radios, and to prevent signals generated by the radio from leaking out. In one exemplary embodiment, enclosure box 40 is a shielded enclosure that may be lined with radio frequency (RF) absorption material such as "echosorb", to further isolate the radio from outside influences, and minimize internal reflections of radio waves.

Prior to testing, the radio may be inserted in enclosure box 40 through door 42, and then may be attached to nest 10 as described above. Alternatively, nest 10 may be removed from enclosure box 40 prior to testing, and the radio may be attached thereto outside of the testing apparatus. The radio and nest 10 combination may then be inserted in enclosure box 40, and may be secured therein. The design of enclosure box 40 and door 42 is such that insertion and removal of the radio with associated components is simple and fast, to support high volume testing of the radios in the production line.

An attachment pedestal 32 may be incorporated in the construction of the enclosure box 40 or of the nest 10. Pedestal 32 provides structural support to the nest 10 with the radio attached thereon. Pedestal 32 may be made of a non metallic material, to avoid interfering with the measurements on the radio. For example, a double sided tape may be used to attach pedestal 32 to surfaces of enclosure box 40, or other appropriate conventional methods may be used. In the exemplary embodiment shown in FIGS. 3 and 4, pedestal 32 extends vertically from a bottom surface of enclosure box 40. However, those of skill in the art will realize that other configurations of pedestal 32 may be also used.

An RF filter box assembly 36 may be provided on one surface of enclosure box 40. RF filter box assembly 36 includes a connector plug 38 to interface with a matching connector from an external control unit, not shown in the drawing. The external control unit may be, for example, a computer or other computing device with software designed to send test signals and commands to the radio being tested, and to receive the radio's output in response to test radio signals. The external control unit may also be connected to additional sensors in the enclosure box 40, to further characterize the radio's performance. For example, the external control unit may send to the radio a series of commands to broadcast radio signals, and the resulting RF energy emitted by the radio may be compared to an expected output. Conversely, the external control unit may command emission of RF energy, and may monitor the radio's reception of the emission.

Another important function of RF filter box assembly 36 is to include a filter 34 to block any RF energy that may leak in or out of enclosure box 40. Since the testing apparatus may be located in areas where strong RF interference exists, RF filter box assembly 36 helps prevent interference with the testing of the radio. Any appropriate conventional RF filter may be used for this purpose. A connection 30 links RF filter box assembly 36 to the nest 10, for example through connectors 22 described above. Connectors 22 may be adapted to interface with corresponding mating connectors of filter box assembly 36, such that when nest 10 is pushed in place abutting filter box assembly 36, an electrical path is formed. This configuration provides a direct electrical path between the radio board being tested and the external control unit. Connection 30 may be shielded, to further minimize interference with the performance characterization of the radio.

The present invention has been described with reference to specific exemplary embodiments, however it is understood that those skilled in the art will be able to devise additional embodiments. Accordingly, various modifications and changes may be made to the embodiments without departing from the broadest spirit and scope of the present invention as set forth in the claims that follow. The specification and drawings are accordingly to be regarded in an illustrative rather than restrictive sense.

What is claimed is:

1. A testing apparatus for a radio transreceiver, comprising:
   a nest assembly to support and retain the radio transreceiver, wherein the nest assembly includes at least one articulated component retaining the radio transreceiver, the at least one articulated component retaining the radio transceiver being movable to a plurality of positions;
   an enclosure box surrounding the nest assembly and radio transreceiver, the enclosure box forming a barrier to RF energy;
   a connection conduit to transfer signals to and from the radio transreceiver, the connection being coupled to the radio transreceiver; and
   a gasket joined to the nest assembly for reducing vibrations, wherein the radio transreceiver is structured as an electric circuit board, and wherein the at least one articulated component includes a slot sized for receiving only the electric circuit board.

2. The testing apparatus according to claim 1, wherein the enclosure box includes a door, the door being adapted for insertion and removal of the radio transreceiver from the enclosure box.

3. The testing apparatus according to claim 1, wherein the connection conduit includes a filter circuit adapted to filter RF energy through the connection.

4. The testing apparatus according to claim 1, wherein the nest assembly includes a clamping cover to secure the radio transreceiver in place.

5. The testing apparatus according to claim 1, wherein the nest assembly includes a bottom part and a top part articulated to the bottom part.

6. The testing apparatus according to claim 5, wherein the bottom part is adapted to mechanically couple to the enclosure box, and the top part forms an interface to the radio transreceiver.

7. The testing apparatus according to claim 5, further comprising:
   a clamping cover to lock the bottom part and the top part in a relative position.

8. The testing apparatus according to claim 6, wherein the absorption material is an "echosorb" material.

9. The testing apparatus according to claim 1, wherein the nest assembly is composed of a non-metallic material.

10. The testing apparatus according to claim 1, wherein the enclosure box is coated with RF absorption material.

11. The testing apparatus according to claim 1, further comprising:
    an antenna holder attached to the nest assembly.

12. The testing apparatus according to claim 1, further comprising:
    a connector plug mating the connection conduit to an external computing device.

13. The testing apparatus according to claim 1, further comprising:
    an antenna connected to the nest assembly.

14. The testing apparatus according to claim 1, further comprising:
    a pedestal stabilizing the nest assembly in the enclosure box.

15. The testing apparatus according to claim 1, wherein the enclosure box prevents leakage of extraneous RF energy to and from the radio transreceiver.

16. The testing apparatus according to claim 1, wherein the nest assembly includes an interface to electrically connect to the radio transreceiver.

17. The testing apparatus according to claim 1, wherein the nest assembly includes a plurality of interfaces, each interface accommodating a different form of the radio transreceiver.

18. A method of over-the-air testing a radio transreceiver, comprising the steps of:
    inserting the radio transreceiver in a shielded enclosure box;
    connecting the radio transreceiver to an interface;
    mechanically securing the radio transreceiver to at least one articulated component, the at least one articulated component retaining the radio transceiver being movable to one of a plurality of selectable positions, the radio transreceiver being structured as an electric circuit board, and the electric circuit board being retained by the at least one articulated component by being received within a slot of the at least one articulated component sized for receiving only the electric circuit board;
    providing test signals to the radio transreceiver;
    monitoring response of the radio transreceiver to the test signals; and
    reducing vibrations via a gasket joined to the at least one articulated component.

19. The method according to claim 18, further comprising the step of:
    securing the radio transreceiver to a nest structure in the enclosure box.

20. The method according to claim 19, further comprising the step of:
    securing the radio transreceiver to the nest structure with a clamping cover.

21. The method according to claim 19, further comprising the steps of:

separating a top part and a bottom part of the nest; and securing the radio transreceiver to the top part of the nest.

22. The method according to claim 21, further comprising the steps of:

joining the top part to the bottom part of the nest; and locking the top part to the bottom part with a clamping cover.

23. The method according to claim 18, wherein the shielded enclosure box is coated with RF absorbing material.

24. The method according to claim 18, further comprising the step of:

providing test commands through the interface and characterizing radio signals emitted by the radio transreceiver in response thereto.

25. The method according to claim 18, further comprising the steps of:

providing test radio signals; and characterizing reception by the radio transreceiver of the test radio signals.

26. A testing system for a radio transreceiver, comprising:

a shielding arrangement isolating the radio transreceiver from extraneous RF energy;

a positioning arrangement retaining the radio transreceiver, wherein the positioning arrangement retaining the radio transceiver is movable to a plurality of positions, the radio transreceiver being structured as an electric circuit board, and the positioning arrangement including a slot for retaining the electric circuit board, the slot being sized to receive only the electric circuit board;

an interface to exchange electrical signals with the radio transreceiver; and a gasket joined to the positioning arrangement for reducing vibrations.

27. The system according to claim 26, wherein the shielding arrangement includes RF energy absorption means.

28. The system according to claim 26, wherein the positioning arrangement includes a mechanical support and clamping arrangement securing the radio transreceiver to the mechanical support.

* * * * *

UNITED STATES PATENT AND TRADEMARK OFFICE
CERTIFICATE OF CORRECTION

| | | |
|---|---|---|
| PATENT NO. | : 7,440,741 B2 | Page 1 of 1 |
| APPLICATION NO. | : 10/251496 | |
| DATED | : October 21, 2008 | |
| INVENTOR(S) | : Comerford et al. | |

It is certified that error appears in the above-identified patent and that said Letters Patent is hereby corrected as shown below:

In Column 1, Line 36, delete "connectivity" and insert -- connectivity. --, therefor.

IN THE CLAIMS

In Column 5, Line 42, in Claim 1, delete "transceiver" and insert -- transreceiver --, therefor.

In Column 6, Line 47, in Claim 18, delete "transceiver" and insert -- transreceiver --, therefor.

In Column 8, Line 7, in Claim 26, delete "transceiver" and insert -- transreceiver --, therefor.

Signed and Sealed this

Thirty-first Day of August, 2010

David J. Kappos
*Director of the United States Patent and Trademark Office*